No. 673,255. Patented Apr. 30, 1901.
S. HAIGH.
FISH DRESSING MACHINE.
(Application filed June 25, 1900.)
(No Model.) 4 Sheets—Sheet 1.
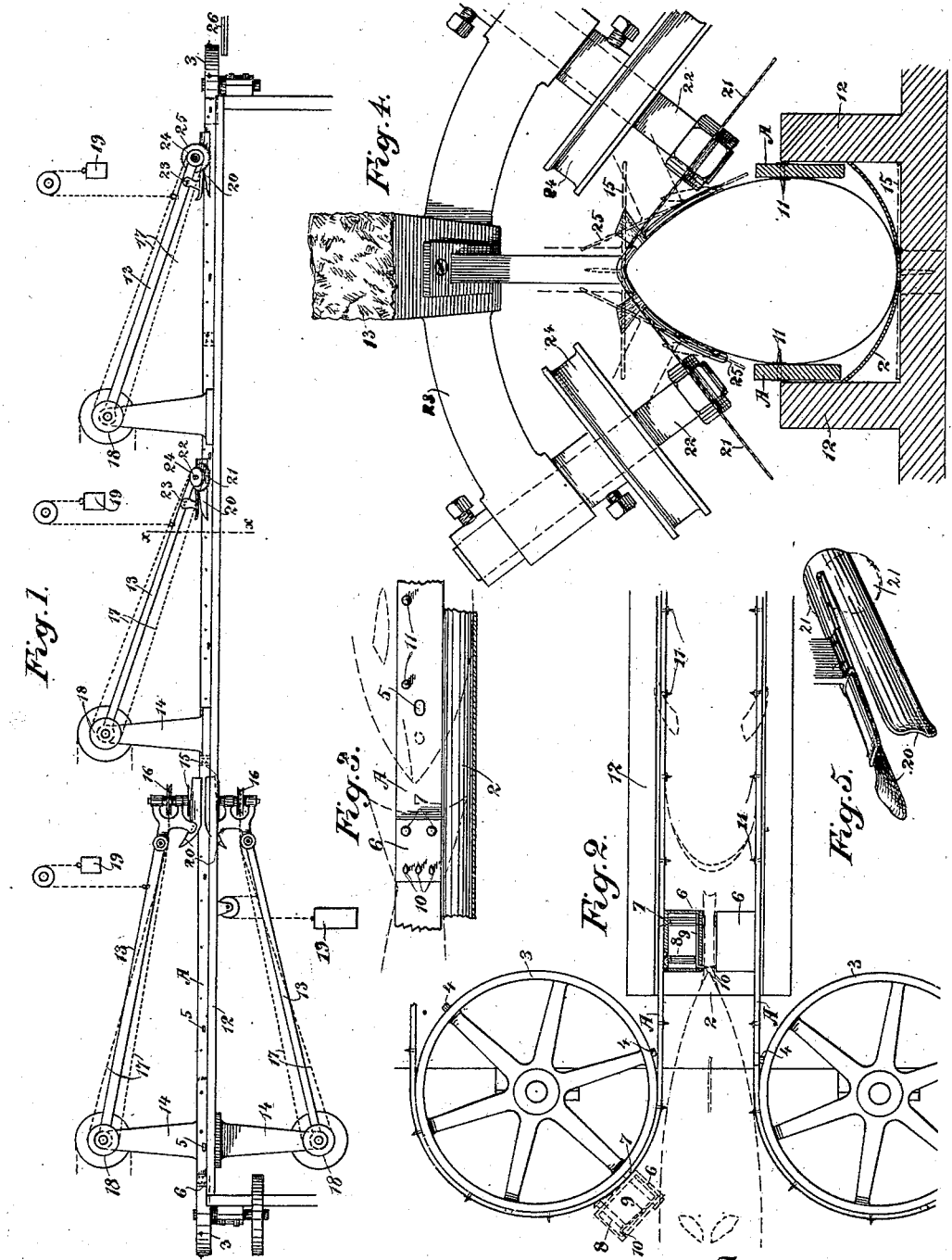

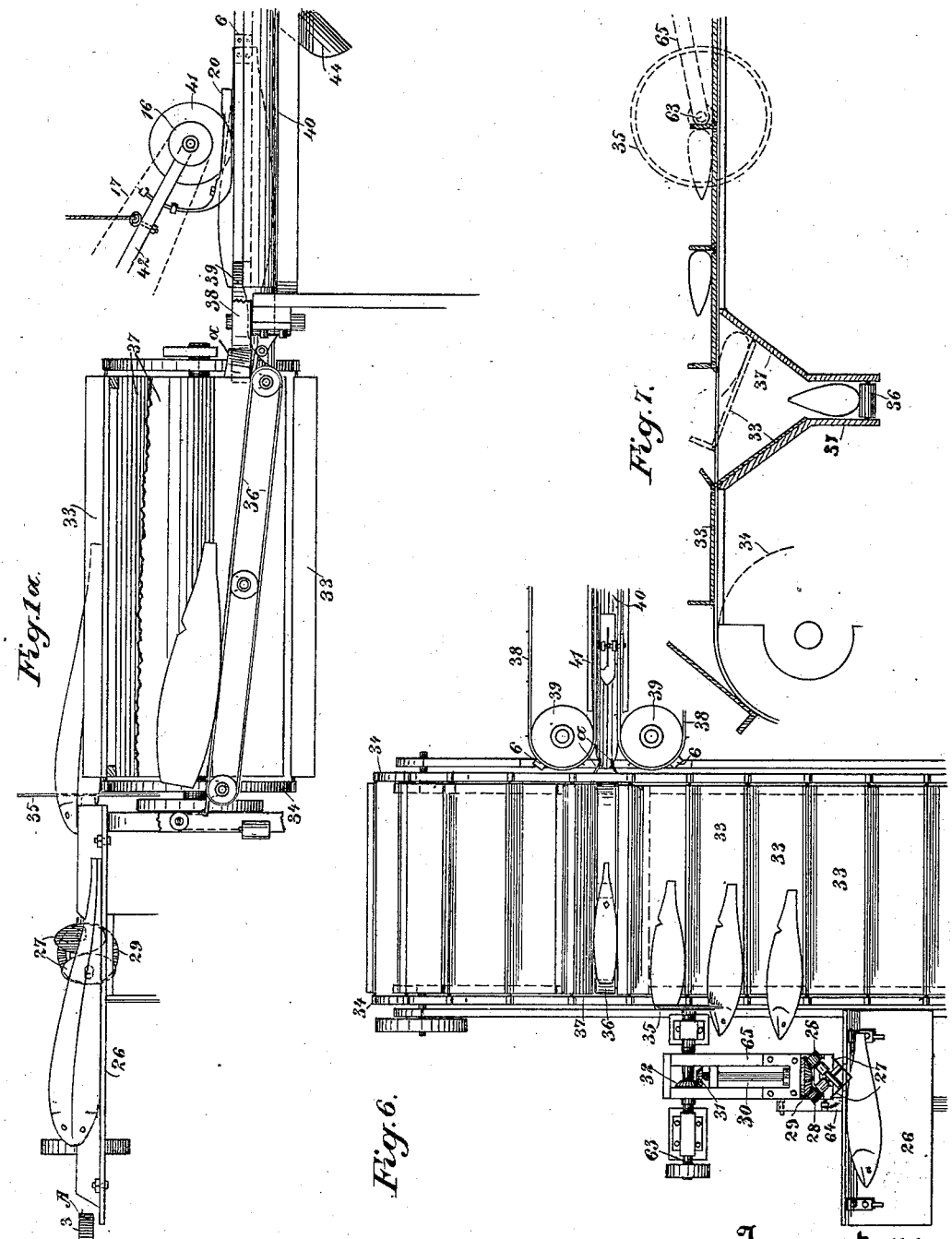

No. 673,255. Patented Apr. 30, 1901.
S. HAIGH.
FISH DRESSING MACHINE.
(Application filed June 25, 1900.)
(No Model.) 4 Sheets—Sheet 3.
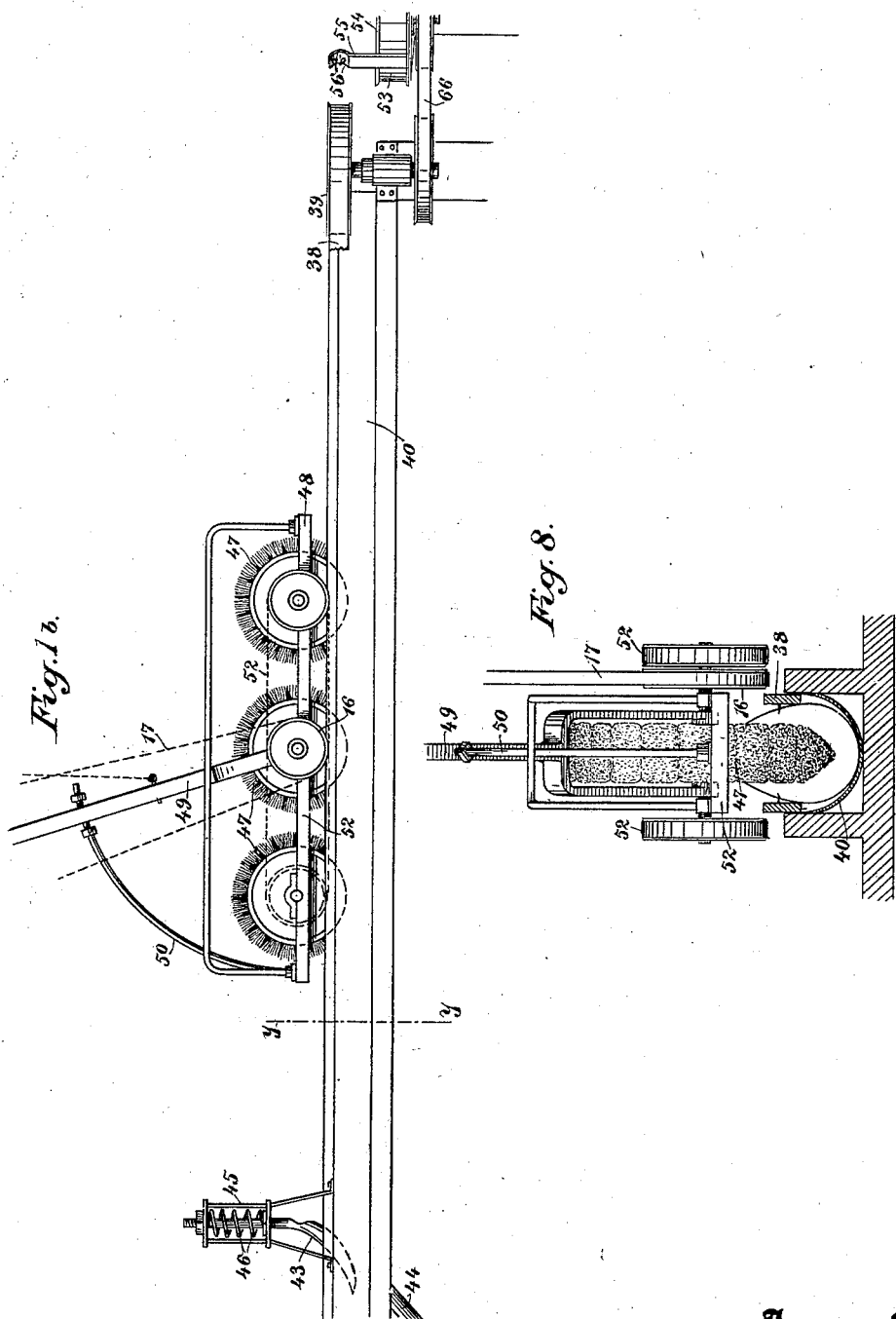

No. 673,255. Patented Apr. 30, 1901.
S. HAIGH.
FISH DRESSING MACHINE.
(Application filed June 25, 1900.)
(No Model.) 4 Sheets—Sheet 4.
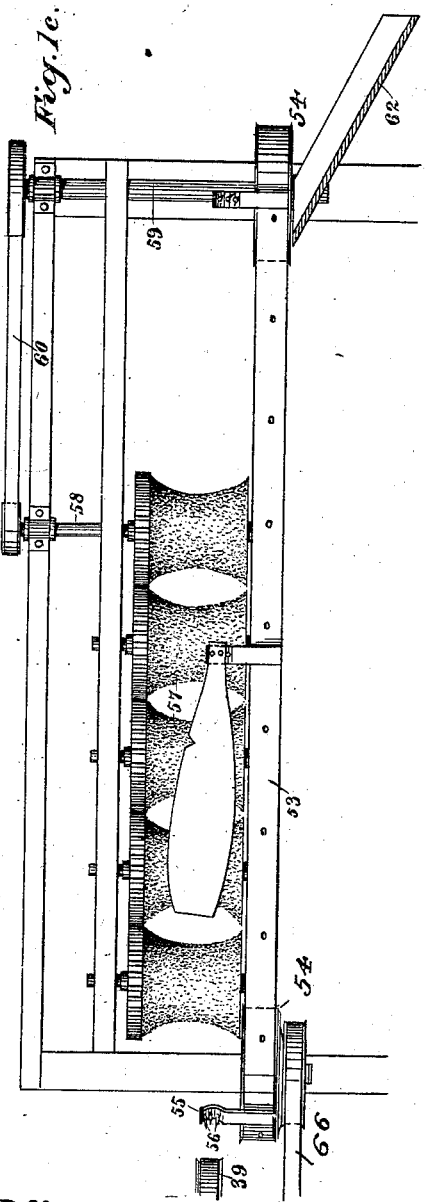
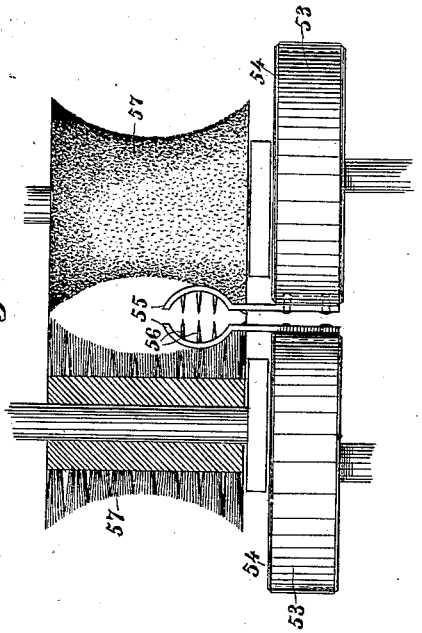
Witnesses,
Inventor,
Samuel Haigh

UNITED STATES PATENT OFFICE.

SAMUEL HAIGH, OF SAN FRANCISCO, CALIFORNIA, ASSIGNOR TO ALASKA PACKERS ASSOCIATION, OF SAME PLACE.

FISH-DRESSING MACHINE.

SPECIFICATION forming part of Letters Patent No. 673,255, dated April 30, 1901.

Application filed June 25, 1900. Serial No. 21,485. (No model.)

*To all whom it may concern:*

Be it known that I, SAMUEL HAIGH, a citizen of the United States, residing in the city and county of San Francisco, State of California, have invented an Improvement in Fish Trimming, Cleaning, and Washing Apparatus; and I hereby declare the following to be a full, clear, and exact description of the same.

My invention relates to an apparatus which is designed to receive the entire fish at one end of a machine, to successively remove the fins, head, tail, and slime, to disembowel and clean the fish, and to place it in condition to be subsequently cut up and introduced into cans or afterward packed.

It consists of a continuous mechanism through which the fish is caused to pass automatically and within which the various operations referred to are carried on successively before its delivery at the rear end of the machine.

It also comprises details of construction, which will be more fully explained by reference to the accompanying drawings, in which—

Figure 1 is a side elevation of the first portion of the apparatus, showing the near belt A broken away to disclose the guides 20 in full lines. Fig. 2 is an enlarged plan view showing in dotted lines the position of the fish entering the apparatus. Fig. 3 is a sectional elevation of the same. Fig. 4 is a transverse section showing the outline of the fish in position between the carriers on line $x$ $x$, Fig. 1. Fig. 5 is a detail of the guide and holder for the fins. Fig. $1^a$ is a view showing the fish in position for cutting out the vent and its transfer to the transverse carrying-table for depriving it of the head, also the device for slitting the belly. Fig. 6 is a plan view of the same. Fig. 7 is a sectional view of the transverse table, showing means for transferring the fish and turning it. Fig. $1^b$ is a continuation of Fig. $1^a$, showing the scoop for removing the intestines and the brushes for cleaning out the insides. Fig. 8 is a section through $y$ $y$ looking toward the brushes. Fig. $1^c$ is a continuation after Fig. $1^b$, showing the brushes for removing the slime from the outside of the fish and connected parts. Fig. 9 is a transverse section showing a pair of the brushes and the carriers by which the fish is moved between the brushes.

The apparatus is of considerable length, and in order to show the parts of sufficient size it is continued on four sheets, the views of the successive parts of the apparatus being marked Figs. 1, $1^a$, $1^b$, and $1^c$.

The object of this invention is to reduce the amount of handling and manual labor in preparing salmon and similar fish in large numbers for the purpose of canning.

In carrying out my invention the fish are first placed in such position as to be received between carrying-belts A. 2 is a concaved trough located below these belts, and within this trough the fish is placed upon its back, belly upward, with the tail toward the belts A. The belts A pass around pulleys or drums 3, so located that there is sufficient space between them for the reception of the fish which is laid in the concave trough 2. The pulleys 3 are here shown as having pins 4 projecting from the peripheries at intervals, and these pins enter corresponding holes or slots 5 made in the belt, so that the belt is driven by positive action and is prevented from slipping. These belts have fixed upon them at intervals boxes 6, the boxes being secured to the belt at one end, as shown at 7. The other end is free to move away from the belt and the pulley-face while passing around it, and this end of the box has a pin 8 slidable transversely through it. The inner side of the box next the fish has a spring-arm 9 fixed at one end, and the other end is turned at right angles and forms a point 10, which is normally retained interior to the box while the belt is passing around the pulley, because while passing around the pulley the end of the box containing the pin 8 is withdrawn from the pulley-face, as shown in dotted lines in Fig. 2, and this allows the point 10 to be retracted within the box. As soon, however, as the belt comes into a straight line the whole inner face of the box will be pressed against the belt, and this will push the pin 8 inwardly, and this acting upon the spring 9 will force the points 10 through the inner sides of the box. These boxes are so arranged on the two belts A that they come together in pairs, and the fish is placed so that as two of these boxes come together the points 10 are pressed into the tail of the fish, so as to draw it along the trough, and as it passes along until the body comes between the belts A the pins 11, which are fixed in the belt, are forced into the body of the fish, and thus steady it in position as it moves along the trough 2. The trough 2 is here shown as being fitted between parallel upwardly-extending walls 12, and the belts A pass between these walls and above the edges of the trough, so that the belt is steadied and retained in place by these walls as it moves along.

Above and below the traveling belts A are arranged fulcrumed levers 13, the outer ends of which are pivoted upon supporting-brackets 14. The inner ends carry the journal-shafts of saws 15. The shafts have upon them pulleys 16, and belts or chains (shown at 17) pass around these pulleys and also around other pulleys, 18, upon shafts journaled in the outer ends of the brackets or supports 14. Power is transmitted to rotate these pulleys and through them the saws or cutters 15, and as the arms 13, upon the free ends of which these saws are carried, are movable about their fulcrum-points it will be seen that they may separate or approach each other, being controlled in this particular by counterbalance-weights 19 and cords or chains passing over direction-pulleys, so that when there is nothing between these levers the saws 15 may approach each other; but when the fish passes between they first cut off the top and bottom projections of the tail, then are separated by following the shape of the fish, and the saws 15 are thus brought into contact with the dorsal fins and those upon the opposite side beyond the vent called the "anal." The fins are at the same time steadied by guides 20, which are plainly shown in Fig. 5, so that the saws may operate to cut off these fins. In practice the weight of the upper lever 13 is sufficient to at all times cause it to move toward the center, and the counterbalance-weight 19 employed in connection therewith is only intended to relieve a portion of this weight, so that the movement will not be too sudden. The other counterbalance-weight 19, which acts upon the companion lower lever 13, is sufficiently heavier than the lever itself to draw the arm up toward the center at all times. Still passing along between the belts A the fish is brought to the next saws or cutters, 21, which are mounted upon shafts or arbors 22, standing at an angle and journaled in a suitable supporting-frame 23. Belts 17 pass around pulleys 24, and thus drive the saws. The ventral fins are at this point moved into guides, such as shown at 20, which steady them, while the saws 21, standing at a suitable angle, as plainly shown in Fig. 4, act to cut off these fins, and when the fins are thus cut off the fish passes on between a final series of saws 25. These saws are driven in the same manner as previously described and stand at a little different angle from the saws 21, as shown in dotted lines in Fig. 4, so that when the pectoral fins reach these saws they are also supported by guides, as at 20, and these last saws sever these fins. Just behind these saws the belts A pass around the pulleys at that end, and separating as they pass outwardly around the pulleys the boxes 6 turn outwardly and in so doing release the points which hold the tail up to this point, and the body of the fish will continue to advance by reason of the points 11 on the belt extending into the sides until it is ready to deliver upon the table 26, which follows this portion of the apparatus. Upon this table, the commencement of which is shown in Fig. 1 and the continuation in Fig. 1ª, the fish is turned upon its side, as shown in Figs. 1ª and 6, and is then brought in contact with the angularly-placed saws 27, the edges of which come together, so as to make a V-shaped cut at the vent. These saws are mounted upon arbors which cross one above the other and suitably journaled, and they have pinions 28 upon the outer ends, and these engage with a bevel or other suitable gear-wheel 29, mounted upon a shaft 30, to which motion is communicated by means of the bevel-gears 31 and 32, one member of which is fixed to the shaft 30 and the other to a shaft 63. This shaft 63 is also the journal about which the frame 65 is turnable to move the saws 27 in making the cut. 64 is the actuating-treadle, which may be of any well-known type. From the table 26, where this operation is performed, the fish is then pushed onto or otherwise moved upon a transverse carrying-table, which is composed of independent hinged sections 33, as shown in Fig. 7. The sections of this table have one edge hinged or fixed to a belt which passes around drums or pulleys at each end, as at 34. Upon the shaft or arbor 63 is mounted another saw or cutter, 35, and the fish resting upon one of the sections 33 and against the upturned edge thereof is moved forward so that the saw 35 removes the head. The fish, still lying upon its side, is then carried along from this cutter until the section upon which it rests passes above the inclined belt 36, which is located at the bottom of a funnel-shaped trough 37. As soon as the hinged or pivoted edge of the section upon which the fish rests has moved nearly across the upper part of this trough 37 the free edge, upon which the fish rests, will drop by gravitation and lie against the opposite inclined side of the trough, and the fish will thus be allowed to drop in turn during the movement, so as to again rest upon the back, with the belly up, lying upon the belt 36. This belt stands at an incline, as shown in Fig. 1ª, and the weight of the fish, together with the inclination, is sufficient to cause the fish to move down the incline until it reaches the opposite side of the transverse belt-frame, where it is again received between carrying-belts 38, passing around pulleys 39, so that the belts move toward each other around these pulleys, and the inner faces are in such position that the projecting points of the belt, which are similar to those shown at 10, Fig. 2, enter the tail of the fish and move it along through a trough 40, in which it lies. Curved springs *a* limit the movement of the fish, so that only the tail projects to be seized by the spring-pressed points 10. Above this trough is arranged the rotary knife or cutter 41, which is mounted at the free end of the lever 42, the opposite end of which is fulcrumed similarly to the lever 13. (Shown in the first part of the apparatus.) This allows the cutter 41 to suit any size of fish that may pass beneath it, and the cutter 41, being centrally located, will split the belly of the fish from the vent forward and open it out for the removal of the intestines. The continuation of the trough 40 is shown in Fig. 1$^b$, and above this trough is mounted a scoop 43 of such shape that as the fish passes beneath this scoop it enters the intestinal cavity, which has been opened by the cut made by the saw 41, and the scoop removes the entrails and internal viscera, which then fall into an inclined trough or chute 44, which connects with an opening in the bottom of the trough at this point, and the parts thus excavated from the fish are carried away through this chute by gravitation to a suitable receptacle or point of discharge. The scoop 43 has a vertical shank passing upward through guides, as at 45, and this shank is movable in the guides, but is acted upon by a spring 46, which while normally pressing it downward will allow it to rise to accommodate itself to the fish which is passing beneath it. The belt 38, still maintaining its hold upon the fish, then carries it beneath the brushes 47. These brushes may be of any suitable number. As here shown there are three of the brushes, which are mounted upon a centrally-fulcrumed tilting frame 48. This frame is pivoted upon the lower free end of a swinging arm 49, the upper end of which is pivoted in a similar manner to that shown at 13 and capable of movement to accommodate this part of the apparatus to the passing fish, and it may also tilt about its center of oscillation. 50 is a segmental guide connecting one end of the frame 48 with the frame 49 and movable within certain limits to allow the frame to tilt, at the same time guiding it so that it will not swing from side to side.

The brushes 47 are rotated by a belt or chain, as at 17, and the three are also driven by a horizontal belt or chain, as at 52. These brushes passing through the intestinal cavity of the fish and rapidly rotating brush and sweep out the interior, thus cleansing it of any remaining contents, and in conjunction with this water-jets (not here shown) may be used to direct the water into the cavity, and thus wash it out. The brushes should all be inclosed or covered to prevent water and offal from being thrown out. After leaving the belt 38 the fish is delivered between final carrying-belts 53, which pass around drums or rollers 54, the belts turning inwardly toward each other as they pass around the pulleys, which are mounted upon vertical shafts and are driven from the previous pulleys 39 by belt connection 66.

Upon the belts 53 are fixed the upwardly-projecting concaved arms 55, having projecting points 56 in their concaved faces, and the movement of the belt is so regulated that these standards with the projecting points seize the tail portion of the fish when it is delivered from the belt 39 and carry it on between the rollers 57. These rollers are vertically disposed and are driven by gearing or other suitable connection through the shafts 58 and 59, having belt-pulleys upon them and a belt or chain 60 passing between these pulleys. The shaft 59 is here shown as driven from one of the drums 54, around which the belt 53 passes; but it is manifest that the parts may be driven by any other suitable connection from moving parts of the machinery. These brushes 57 are rapidly revolved and are concaved so as to approximately fit the convex surface of the fish, and the character of the brushes is such that they remove the slime from the fish as it passes between them, thus leaving it entirely clean and ready to be discharged into the final delivery-chute 62.

Suitable jet-tubes may be employed to supply water to wash the fish during any portion of an operation and after its final discharge through the chute 62. The fish is thus carried through the apparatus and by the various successive operations is thoroughly cleaned and prepared to be cut up and placed in cans or otherwise packed.

Having thus described my invention, what I claim as new, and desire to secure by Letters Patent, is—

1. An apparatus for cleaning fish including a guide for the fish, substantially parallel, endless carriers having gripping devices, means whereby the gripping devices are thrown into action to engage the fish when said devices meet in pairs upon each side of the fish, and splitting appliances in the path of the fish and adapted to operate upon the latter.

2. An apparatus for cleaning fish consisting of a trough within which the fish is laid, belts passing around vertically-journaled pulleys and movable along the line of the trough, points carried by the belts and meeting in pairs upon each side of the tail of the fish and adapted to seize the tail of the fish when it is presented and to carry the fish through the trough and cutters or saws so located as to remove the fins of the fish as it passes the cutters.

3. An apparatus for cleaning fish, consisting of a trough within which the fish is placed upon its back, endless traveling belts between which the fish passes, boxes carried by said belts adapted to meet in pairs upon each side of the tail of the fish, spring-pressed points located within the boxes and normally withdrawn from the surface, slidable pins passing through the boxes adapted to press upon the springs and to force the points outward as the boxes come together, whereby the points are pressed into the tail of the fish upon each side to drag it through the apparatus in unison with the movements of the belts.

4. In an apparatus for cleaning fish, endless traveling belts passing around vertically-journaled pulleys, a trough located between and below the inner sides of the belts to receive the fish, boxes having one end attached to each of the belts so that they approach each other in pairs after passing around the pulleys at the entering end, said boxes having spring-pressed points adapted to be projected through their inner faces, slidable pins passing through the boxes having their inner ends contacting with the point-carriers, and the opposite ends projecting through the side of the boxes at their free ends so that while passing around the pulleys, the points are allowed to withdraw into the boxes, but are pressed outward as they approach and come parallel with each other by the pressure of the pins against the belts when the latter approach a straight line of travel whereby the points are caused to enter and seize the tail of the fish.

5. In an apparatus for cleaning fish, endless traveling belts passing around vertically-journaled pulleys, a trough located between the adjacent sides of the belts, within which trough the fish is placed, with the tail in line of travel, boxes carried by the belts adapted to approach each other in pairs after passing around the pulleys at the entering ends, said boxes having spring-pressed points, and means whereby they are forced outwardly to seize the tail of the fish when the latter is presented, and other points projecting from the belt adapted to enter and grasp the sides of the fish whereby it is steadied and carried through the trough, and saws or cutters so disposed with relation to the trough and the moving fish as to sever the fins during the passage of the fish.

6. The combination in an apparatus for cleaning fish of endless traveling belts movable about vertically-journaled pulleys, a trough located below said belts within which the fish is placed, means carried by the belts for seizing and advancing the fish along the line of the trough, fulcrumed arms having counterbalanced weights by which they are caused to approach the fish from above and below, horizontally-revoluble saws, the arbors of which are journaled in said arms and means for rotating the saws whereby they sever the vertical dorsal and anal fins as the fish passes between them.

7. The combination in a fish-cleaning apparatus of endless traveling belts carried by pulleys mounted upon vertical shafts, a trough located below the contiguous sides of the belts within which the fish is placed, means carried by the belts whereby the fish is seized and advanced along the trough, a series of arms or frames having one end pivoted, with the other ends free and movable vertically, revoluble saws or cutters carried by the free ends of the arms, counterbalance-weights by which they are yieldingly approached toward each other above and below the fish whereby the vertical fins and the upper and lower parts of the caudal fin are separated from the fish, and other pivoted counterbalanced arms with inclined saws revolubly mounted in their movable ends whereby the ventral and pectoral fins are successively removed from the fish.

8. The combination in an apparatus for cleaning fish of endless traveling belts mounted upon drums having vertical shafts, a trough located below the belts within which the fish is placed, means carried by the belts adapted to grasp the fish and move it along the trough, revoluble saws or cutters carried upon movable counterbalance-frames whereby the caudal vertical, ventral and pectoral fins are successively removed, and guides between which the fins pass and are supported adjacent to the cutters so that they are steadied while being acted upon by the cutters.

9. The combination in a fish-cleaning apparatus of a table upon which the fish is delivered after the fins are removed, cutters mounted and revoluble diagonally with relation to each other and adapted to cut out the vent from the fish, an endless traveling table upon which the fish is received, and a saw or cutter in the path of the fish carried by the said traveling table and adapted to sever the head from the fish.

10. The combination in an apparatus for cleaning fish of a transverse table upon which the fish is received, said table consisting of hinged sections, with upturned edges, a saw or cutter beneath which the fish is carried by said table, whereby the head is severed therefrom, an open trough extending across beneath the sectional table into which the free ends of the sections drop as they pass above it whereby the fish is automatically delivered into the trough beneath.

11. In an apparatus for cleaning fish, a transversely-movable sectional table upon which the fish is delivered, a saw beneath which it is carried by said table to sever the head, a trough extending from side to side beneath said table having inclined sides whereby the hinged sections of the table are allowed to tilt when passing over said trough to drop the fish therein, a traveling belt located in line beneath the trough, guides between which the fish passes so as to be delivered upon said belt, and means for discharging the fish from said belt into a second longitudinal trough.

12. In an apparatus for cleaning fish, a transversely-movable belt formed of hinged sections with upturned edges upon which the fish is carried while the head is being removed, a trough extending from side to side beneath said table having inclined sides into which the hinged sections successively drop to discharge the fish thereinto, an endless belt located beneath said trough upon which the fish is deposited therefrom, said belt standing at an incline so that it and the fish move by gravitation and the latter is delivered therefrom, and a second longitudinal trough beyond the transverse belt.

13. The combination in an apparatus for cleaning fish of means for delivering the fish tail foremost in the longitudinal line of travel after the head has been removed, endless traveling belts passing around vertically-journaled pulleys, and means carried by the belts and meeting in pairs upon each side of the fish whereby the fish is seized and carried between them, a vertically-revoluble central cutter, a hinged counterbalanced frame upon which the cutter is mounted said frame disposed vertically in line above the path of travel of the fish whereby the belly is cut open from end to end, and a stationary scoop succeeding thereto whereby the entrails are removed from the opened cavity.

14. The combination in an apparatus for cleaning fish of a cutter by which the fish is split along the belly, a spring-pressed yielding scoop by which the contents of the cavity thus opened are removed, and an inclined chute connecting with an opening in the bottom of the trough along which the fish is moving through which the contents of the cavity are discharged by gravitation.

15. In an apparatus for cleaning fish, mechanism by which the fish is advanced, and saws or cutters operating in succession by which the head is removed and the fish split open, a scraper whereby the contents of the cavity are removed, and brushes mounted upon a tiltable and yielding frame and adapted to rotate through the open cavity as the fish passes to cleanse the interior of said cavity.

16. In an apparatus for cleaning fish, mechanism by which the head and entrails are successively removed and the interior of the cavity cleansed, and endless traveling belts mounted upon pulleys having vertically-journaled shafts, arms having points projecting inwardly therefrom, said arms approaching each other in pairs and adapted to seize the tail of the fish after the entrails have been removed, and vertically-journaled revoluble brushes between which the fish is carried by the movement of the belt, said brushes acting to remove the slime from the outside of the fish during its passage between them.

17. In an apparatus for cleaning fish, means for removing the slime from the outside of the fish, consisting of endless traveling belts passing around vertically-journaled pulleys, said belts having upwardly-projecting arms which approach each other in pairs, and passing around the pulleys at the receiving end, said arms having concaved faces with inwardly-projecting points adapted to seize the tail of the fish when presented thereto, concaved brushes located upon each side of the path of travel of the fish, and means for rotating them whereby the slime is removed from the outer surface during the passage of the fish between the brushes.

In witness whereof I have hereunto set my hand.

SAMUEL HAIGH.

Witnesses:
S. H. NOURSE,
JESSIE C. BRODIE.